United States Patent
Yoon et al.

(10) Patent No.: US 10,094,465 B2
(45) Date of Patent: Oct. 9, 2018

(54) METHOD FOR CONTROLLING ELECTRONIC OIL PUMP OF TRANSMISSION

(71) Applicant: HYUNDAI MOTOR COMPANY, Seoul (KR)

(72) Inventors: Young Min Yoon, Suwon-si (KR); Yong Uk Shin, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 292 days.

(21) Appl. No.: 15/089,088

(22) Filed: Apr. 1, 2016

(65) Prior Publication Data

US 2017/0108112 A1 Apr. 20, 2017

(30) Foreign Application Priority Data

Oct. 20, 2015 (KR) .................. 10-2015-0146254

(51) Int. Cl.
*F16H 57/04* (2010.01)

(52) U.S. Cl.
CPC ..... *F16H 57/0435* (2013.01); *F16H 57/0412* (2013.01); *F16H 57/0473* (2013.01)

(58) Field of Classification Search
None
See application file for complete search history.

(56) References Cited

U.S. PATENT DOCUMENTS

| | | | | |
|---|---|---|---|---|
| 2011/0319227 | A1* | 12/2011 | Kamada | B60W 10/06 477/83 |
| 2013/0078111 | A1* | 3/2013 | Okamoto | F04B 49/02 417/32 |
| 2014/0100748 | A1* | 4/2014 | Kim | B60W 10/023 701/68 |
| 2014/0244091 | A1* | 8/2014 | Eto | B60K 6/48 701/22 |

(Continued)

FOREIGN PATENT DOCUMENTS

| | | |
|---|---|---|
| JP | 5-14726 U | 2/1993 |
| JP | 2006-234164 A | 9/2006 |

(Continued)

OTHER PUBLICATIONS

Korean Office Action dated Feb. 23, 2017, issued in Korean patent application No. 10-2015-0146254.

*Primary Examiner* — Justin Holmes
(74) *Attorney, Agent, or Firm* — McDermott Will & Emery LLP

(57) ABSTRACT

A method for controlling an Electronic Oil Pump (EOP) of a transmission includes performing a clutch temperature determination by determining whether a temperature of a clutch is equal to or greater than a predetermined reference value (A) previously input to a control unit, performing a vehicle speed check by, if it is determined that the clutch temperature is less than the predetermined reference value (A) previously input to the control unit, checking whether a vehicle speed is equal to or greater than a predetermined reference value (C) previously input to the control unit, and (Continued)

performing oil supply by the control unit supplying oil to the transmission by operating the EOP, wherein the oil supplied from the EOP is selectively supplied to a clutch or a gear of the transmission by controlling a solenoid valve.

12 Claims, 2 Drawing Sheets

(56) References Cited

U.S. PATENT DOCUMENTS

| | | | |
|---|---|---|---|
| 2014/0342865 A1* | 11/2014 | Hayashi | B60K 6/365 |
| | | | 475/5 |
| 2015/0032316 A1* | 1/2015 | Chin | B60K 6/52 |
| | | | 701/22 |
| 2015/0080175 A1* | 3/2015 | Kobayashi | B60K 6/48 |
| | | | 477/5 |
| 2016/0084375 A1* | 3/2016 | Yoon | F16H 61/0213 |
| | | | 701/55 |

FOREIGN PATENT DOCUMENTS

| | | |
|---|---|---|
| JP | 2009-156464 A | 7/2009 |
| JP | 2012-515883 A | 7/2012 |
| JP | 2012-215246 A | 11/2012 |
| JP | 2013-241992 A | 12/2013 |
| JP | 2014-073740 A | 4/2014 |
| KR | 10-0802734 B1 | 2/2008 |
| WO | 2010/083862 A1 | 7/2010 |

* cited by examiner

METHOD FOR CONTROLLING ELECTRONIC OIL PUMP OF TRANSMISSION

CROSS REFERENCE TO RELATED APPLICATION

The present application claims the benefit of priority to Korean Patent Application No. 10-2015-0146254, filed on Oct. 20, 2015 with the Korean Intellectual Property Office, the entire contents of which is incorporated herein for all purposes by this reference.

TECHNICAL FIELD

The present disclosure generally relates to a control method for supplying oil to the transmission of a vehicle and, more particularly, to a method for controlling the Electronic Oil Pump (EOP) of a transmission, which is equipped with an EOP to separately perform gear lubrication and clutch cooling for the transmission.

BACKGROUND

The types of clutches for controlling the electric power of a vehicle may be classified into wet, dry, cone, magnetic, and dog-tooth clutches. Recently, vehicles on which a coaxial type dual clutch is mounted have been commercially released. Such a Dual Clutch Transmission (DCT) denotes a type of transmission in which two clutches are arranged on the front side of the transmission and are selectively and continuously operated, and thus gear shift time is greatly reduced. Such a DCT is an evolution of an automated manual transmission, and has recently attracted attention owing to the advantages thereof, such as low power loss, high efficiency, and sporty driving feel based on fast gear shifting, together with the high economic efficiency of a manual transmission.

In particular, in a dry clutch, the radius of the clutch must be increased so as to increase transmission torque, but the layout of the clutch is limited and thus an increase in transmission torque is restricted. Thus, it is difficult to apply a dry clutch to high-performance vehicles or large vehicles. In contrast, a DCT using a wet multi-plate clutch is advantageous in that transmissible torque can be increased if the number of plates of the multi-plate clutch is increased so as to transmit high torque/high output engine power. At this time, the wet multi-plate clutch is controlled using oil pressure, unlike a dry clutch that controls strokes.

Development of a wet DCT hydraulic system has shown a tendency to adopt a scheme for performing line pressure control using an EOP and an accumulator, thus improving fuel efficiency. In particular, a DCT is greatly advantageous in that drivability is excellent thanks to the direct connection property of a manual transmission, and power transmission efficiency is high owing to the features of a parallel-axis gear.

However, there is a problem in that, for cooling and lubrication of a transmission, a Mechanical Oil Pump (MOP) and an EOP are simultaneously driven, and a gear is always partially immersed in oil, thus deteriorating fuel efficiency.

The foregoing is intended merely to aid in the better understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problems occurring in the prior art, and an object of the present disclosure is to provide a method for controlling the EOP of a transmission, which minimizes the operating time and the number of operations of an EOP and also minimizes power consumption by minimizing the oil pressure leak of a hydraulic system, thus consequently improving fuel efficiency.

In order to accomplish the above object, the present disclosure provides a method for controlling an Electronic Oil Pump (EOP) of a transmission, including performing a clutch temperature determination by determining whether a temperature of a clutch is equal to or greater than a predetermined reference value (A) previously input to a control unit; performing a vehicle speed check by, if it is determined that the clutch temperature is less than the predetermined reference value (A) previously input to the control unit, checking whether a vehicle speed is equal to or greater than a predetermined reference value (C) previously input to the control unit; and performing oil supply by the control unit supplying oil to the transmission by operating the EOP, wherein the oil supplied from the EOP is selectively supplied to a clutch or a gear of the transmission by controlling a solenoid valve.

Performing the clutch temperature determination may include if the clutch temperature is equal to or greater than the predetermined value (A) previously input to the control unit, performing a temperature comparison by the control unit detecting a temperature of transmission oil and by checking whether an absolute value of a result, obtained by subtracting the detected transmission oil temperature from the clutch temperature, is equal to or greater than a predetermined reference value (B) previously input to the control unit.

Performing the temperature comparison may include if the absolute value of the result, obtained by subtracting the detected transmission oil temperature from the clutch temperature, is equal to or greater than the predetermined reference value (B) previously input to the control unit, performing the oil supply where the control unit supplies oil to the transmission by operating the EOP so that the oil supplied from the EOP is supplied to the clutch of the transmission by controlling the solenoid valve, thus cooling the clutch.

Performing the vehicle speed check may be performed if the absolute value of the result, obtained by subtracting the detected transmission oil temperature from the clutch temperature, is less than the predetermined reference value (B) previously input to the control unit.

Performing the vehicle speed check may include if the vehicle speed is equal to or greater than a predetermined reference value (C) previously input to the control unit, performing an oil temperature determination by the control unit detecting a temperature of transmission oil and determining whether the detected transmission oil temperature is equal to or greater than a predetermined reference value (D) previously input to the control unit.

Performing the oil temperature determination may include if the transmission oil temperature is equal to or greater than the predetermined reference value (D) previously input to the control unit, the oil supply is performed where the control unit supplies oil to the transmission by operating the EOP, wherein the oil supplied from the EOP is supplied to the gear of the transmission by controlling the solenoid valve, thus lubricating the gear.

Performing the oil temperature determination may further include, if the transmission oil temperature is less than the predetermined reference value (D) previously input to the control unit, performing a transmission temperature determination by the control unit detecting a temperature of the transmission and determining whether the transmission temperature is equal to or greater than a predetermined reference value (E) previously input to the control unit.

Performing the transmission temperature determination may include detecting the transmission temperature; and if the transmission temperature is equal to or greater than the predetermined reference value (E) previously input to the control unit, performing the oil supply where the control unit supplies oil to the transmission by operating the EOP, wherein the oil supplied from the EOP is supplied to the gear of the transmission by controlling the solenoid valve, thus lubricating the gear.

Performing the transmission temperature determination may include detecting the transmission temperature; and if the transmission temperature is less than the predetermined reference value (E) previously input to the control unit, the control unit does not operate the EOP.

Performing the vehicle speed check may include if the vehicle speed is less than the predetermined reference value (C) previously input to the control unit, the control unit does not operate the EOP.

The solenoid valve may be disposed between a line for supplying oil to the clutch and a line for supplying oil to the gear.

The solenoid valve may be formed to be capable of adjusting a degree of opening thereof, thus enabling the oil supplied from the EOP to be distributed at a predetermined rate and supplied to the clutch or the gear.

That is, the method may determine whether the vehicle is being driven, but is in a cold state, based on multiple factors that are measured by the transmission and are input to a control unit to enable a state of the vehicle to be checked; and if the vehicle is not in the cold state, selectively perform one or more of cooling of a clutch and lubrication of a gear by operating a solenoid valve and the EOP.

Therefore, in accordance with the method for controlling the EOP of the transmission according to the present disclosure having the above configuration, to cool and lubricate the transmission of the vehicle, a high-precision and low-leak solenoid valve is installed in an oil line, and oil is supplied into the transmission in an oil injection manner, other than in an oil churning manner, by controlling the solenoid valve. Further, since one of the purposes of clutch cooling and gear lubrication is selected according to the necessity and oil is selectively supplied by controlling the solenoid valve, the present disclosure is advantageous in that the oil pressure leak of a hydraulic system may be minimized, so that the operating time and the number of operations of the EOP are minimized and power consumption is minimized, thus improving fuel efficiency and increasing the durability of the transmission.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Hereinafter, a method for controlling the Electronic Oil Pump (EOP) of a transmission according to embodiments of the present disclosure will be described in detail with reference to the attached drawings.

Figure 1:
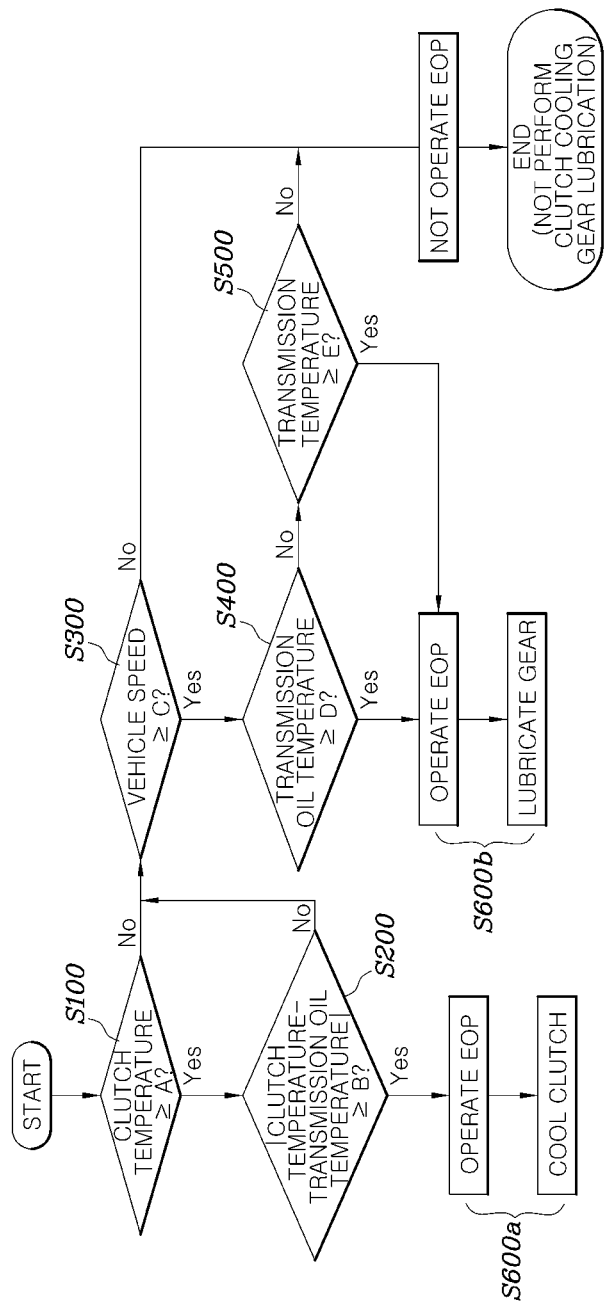
FIG. 1 is a flowchart showing a method for controlling an EOP of a transmission according to an embodiment of the present disclosure.
Figure 2:
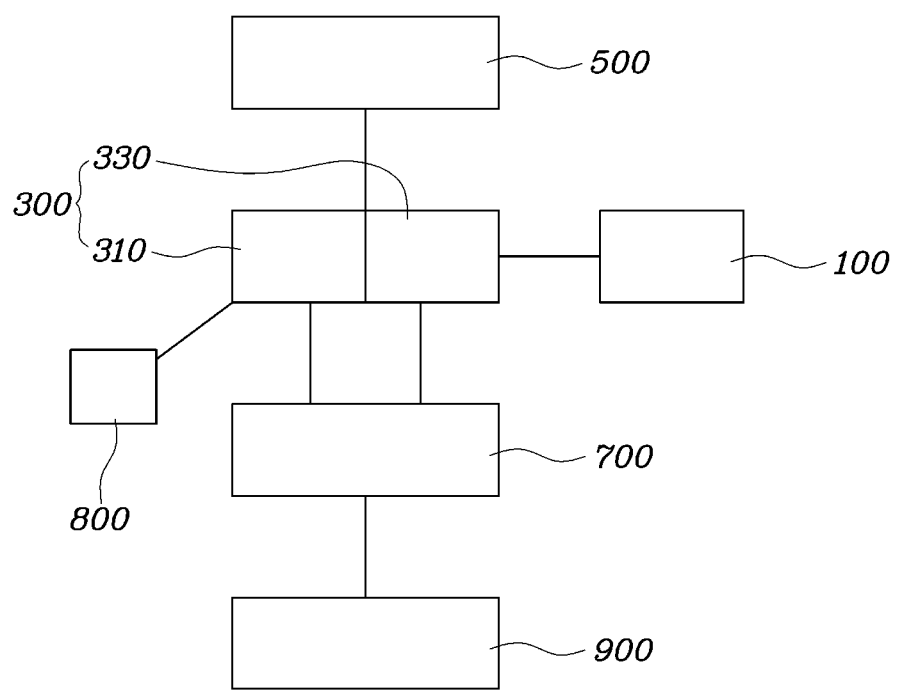
FIG. 2 is a configuration diagram of a system for performing the method of FIG. 1.

FIG. 1 is a flowchart showing a method for controlling an EOP of a transmission according to an embodiment of the present disclosure, and FIG. 2 is a configuration diagram of a system for performing the method of FIG. 1.

A method for controlling the EOP of a transmission according to the embodiment of the present disclosure may include a clutch temperature determination step S100 of determining whether the temperature of a clutch is equal to or greater than a predetermined reference value A previously input to a control unit 500; a vehicle speed checking step S300 of, if it is determined at the clutch temperature determination step S100 that the clutch temperature is less than the predetermined reference value A previously input to the control unit 500, checking whether the speed of a vehicle is equal to or greater than a predetermined reference value C previously input to the control unit 500; and an oil supply step S600 of the control unit 500 supplying oil to a transmission 300 by operating an EOP 900 so that oil supplied from the EOP 900 is selectively supplied to the clutch 330 or the gear 310 of the transmission 300 by controlling a solenoid valve 700.

When the engine 100 of the vehicle starts to be driven, the control unit 500 may perform the clutch temperature determination step S100 of determining whether the clutch temperature is equal to or greater than the predetermined reference value A previously input to the control unit 500. At the clutch temperature determination step S100, when the clutch temperature is equal to or greater than the predetermined reference value A previously input to the control unit 500, the control unit 500 may further perform the temperature comparison step 200 of detecting the temperature of transmission oil using a sensor 800 or the like, and determine whether the absolute value of a result obtained by subtracting the detected transmission oil temperature from the clutch temperature is equal to or greater than a predetermined reference value B previously input to the control unit 500.

At the temperature comparison step S200, when the absolute value of the result obtained by subtracting the detected transmission oil temperature from the clutch temperature is equal to or greater than the reference value B previously input to the control unit 500, an oil supply step S600a may be performed. At this time, the control unit 500 may supply oil to the transmission 300 by operating the EOP 900 and cause the oil supplied from the EOP 900 to be supplied to the clutch 300 of the transmission 300 by controlling the solenoid valve 700, thus cooling the clutch 330.

That is, it is determined that the temperature of the clutch 330 is relatively high, the difference between the clutch temperature and the transmission oil temperature is equal to or greater than the predetermined reference value B, and the cooling of the clutch 330 is required due to the high temperature of the clutch 330, and thus oil is supplied to the clutch 330 by operating the EOP 900, with the result that the clutch 330 is cooled.

However, if the absolute value of the result obtained by subtracting the detected transmission oil temperature from the clutch temperature is less than the predetermined reference value previously input to the control unit 500, the vehicle speed checking step S300 may be performed, where it is determined whether the speed of the vehicle is equal to or greater than the predetermined reference value C previously input to the control unit 500. That is, if it is determined that the clutch temperature is relatively high, but it is checked that the difference between the clutch temperature and the transmission oil temperature is not very large, it may be determined that there is no need to cool the clutch 330, and it is checked whether lubrication of the gear 310 is required.

To determine whether lubrication of the gear 310 is required, the vehicle speed checking step S300 may be check whether the vehicle speed is equal to or greater than the predetermined reference value C previously input to the control unit 500. At the vehicle speed checking step S300, if the vehicle speed is equal to or greater than the reference value C previously input to the control unit 500, the method may further include an oil temperature determination step S400 of the control unit 500 detecting the temperature of transmission oil and determining whether the detected transmission oil temperature is equal to or greater than a predetermined reference value D previously input to the control unit 500. Here, the temperature of transmission oil, detected by the sensor 800 or the like at the temperature comparison step S200, may be reused as the temperature of transmission oil, or the temperature of transmission oil may be detected again.

At the oil temperature determination step S400, if the transmission oil temperature is equal to or greater than the predetermined reference value D previously input to the control unit 500, an oil supply step S600b may be performed, where the control unit 500 supplies oil to the transmission 300 by operating the EOP 900 so that the oil supplied from the EOP 900 is supplied to the gear 310 of the transmission 300 by controlling the solenoid valve 700, thus lubricating the gear 310.

However, at the oil temperature determination step S400, if the transmission oil temperature is less than the predetermined reference value D previously input to the control unit 500, the method may further include the transmission temperature determination step S500 of the control unit 500 detecting the transmission temperature using the sensor 800 or the like, and determining whether the detected transmission temperature is equal to or greater than a predetermined reference value E previously input to the control unit 500.

At the transmission temperature determination step S500, the transmission temperature is detected. Further, if the transmission temperature is equal to or greater than the predetermined reference value E previously input to the control unit 500, the oil supply step S600b may be performed where the control unit 500 supplies oil to the transmission 300 by operating the EOP 900 so that the oil supplied from the EOP 900 is supplied to the gear 310 of the transmission 300 by controlling the solenoid valve 700, thus lubricating the gear 310.

When the vehicle is continuously driven at a predetermined speed or more, but the transmission oil temperature is relatively low due to a cold state, if oil is supplied to the gear 310, fuel efficiency may be deteriorated due to the influence of drag. More specifically, since oil may act as a load if the gear 310 is driven in the state in which the gear 310 is immersed in oil by supplying oil to the gear 310 even in a cold state, more power is required to drive the gear 310, thus reducing fuel efficiency.

Therefore, in the present disclosure, if the temperature of the transmission oil is low, the EOP 900 is not operated, so that oil is prevented from being supplied to the gear 310, thus improving fuel efficiency. However, since the transmission oil temperature is low, but the transmission 300 is continuously driven, the temperature of the transmission 300 is continuously increased due to the friction, or other interactions, between parts. At this time, when the temperature of the transmission 300 is equal to or greater than the predetermined reference value E pre-stored in the control unit 500, the transmission 300 may be degraded, or heat traces attributable to degradation may occur, thus negatively influencing the durability of the transmission 300. Therefore, in order to increase the durability of the transmission 300 by protecting the transmission 300, if it is determined that the transmission oil temperature is less than the predetermined reference value, but the transmission temperature is equal to or greater than the predetermined reference value E, the EOP 900 may be operated and then oil may be supplied to the transmission 300. In this case, the control unit 500 controls the solenoid valve 700 so that the oil supplied from the EOP 900 is supplied to the gear 310 of the transmission 300, thus lubricating the gear 310.

However, at the transmission temperature determination step S500, when the transmission temperature is detected, and the detected transmission temperature is less than the predetermined reference value E previously input to the control unit 500, the control unit 500 may terminate control without operating the EOP 900.

Similarly, if at the vehicle speed checking step S300, the vehicle speed is less than the predetermined reference value C previously input to the control unit 500, the control unit 500 may terminate control without operating the EOP 900.

That is, the transmission EOP control method according to the embodiment of the present disclosure determines whether the vehicle is being driven, but it is in a cold state, based on multiple factors that are measured at the transmission 300 and are input to the control unit 500 to enable the state of the vehicle to be checked. If the vehicle is not in a cold state, the method of the present disclosure may selectively perform one or more of the cooling of the clutch 330 and the lubrication of the gear 310 by driving the solenoid valve 700 and the EOP 900.

In the present disclosure, the clutch temperature and the transmission temperature may be directly measured using the sensor 800 or the like, or predicted temperatures may be derived by the control unit 500 and may then be used. Further, as the transmission oil temperature, the value detected by the sensor 800 or the like may be used.

The transmission 300 of the present disclosure may be a 9-speed wet DCT. Further, the solenoid valve 700 may be disposed between a line for supplying oil to the clutch 330 and a line for supplying oil to the gear 310. By controlling On/Off operations of the solenoid valve 700, oil supplied from the EOP 900 may be selectively supplied to the clutch 330 and to the gear 310. However, in the present disclosure, the solenoid valve 700 may be formed to not only simply perform On/Off control, but also to adjust a degree of opening of the solenoid valve 700 in some cases, thus enabling the oil supplied from the EOP 900 to be distributed at a predetermined rate and supplied to the clutch 330 or to the gear 310. Such a configuration may be freely changed by those skilled in the art depending on the environment or design scheme, and is not especially limited to specific forms.

Therefore, in accordance with a method for controlling the EOP of the transmission according to the present disclosure, to cool and lubricate the transmission of the vehicle, a high-precision and low-leak solenoid valve may be installed in an oil line, and oil may be supplied into the transmission in an oil injection manner, other than in an oil churning manner, by controlling the solenoid valve. Further, since one of the purposes of clutch cooling and gear lubrication is selected according to the necessity and oil is selectively supplied by controlling the solenoid valve, the present disclosure is advantageous in that an oil pressure leak of a hydraulic system may be minimized, so that the operating time and the number of operations of the EOP are minimized and power consumption is minimized, thus improving fuel efficiency and increasing the durability of the transmission.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A method for controlling an Electronic Oil Pump (EOP) of a transmission, comprising:
    performing a clutch temperature determination by comparing with a predetermined reference value (A) previously input to a control unit;
    performing a vehicle speed check by, when it is determined that the clutch temperature is less than the predetermined reference value (A) previously input to the control unit, comparing a vehicle speed with a predetermined reference value (C) previously input to the control unit; and
    performing oil supply by the control unit supplying oil to the transmission by operating the EOP, wherein the oil supplied from the EOP is selectively supplied to a clutch or a gear of the transmission by controlling a solenoid valve.

2. The method of claim 1, wherein the step of performing the clutch temperature determination comprises:
    when the clutch temperature is equal to or greater than the predetermined value (A) previously input to the control unit, performing a temperature comparison by the control unit detecting a temperature of transmission oil and by comparing an absolute value of a result, obtained by subtracting the detected transmission oil temperature from the clutch temperature, with a predetermined reference value (B) previously input to the control unit.

3. The method of claim 2, wherein the step of performing the temperature comparison comprises:
    when the absolute value of the result, obtained by subtracting the detected transmission oil temperature from the clutch temperature, is equal to or greater than the predetermined reference value (B) previously input to the control unit, performing the oil supply where the control unit supplies oil to the transmission by operating the EOP so that the oil supplied from the EOP is supplied to the clutch of the transmission by controlling the solenoid valve, thus cooling the clutch.

4. The method of claim 2, wherein the step of performing the vehicle speed check is performed when the absolute value of the result, obtained by subtracting the detected transmission oil temperature from the clutch temperature, is less than the predetermined reference value (B) previously input to the control unit.

5. The method of claim 1, wherein the step of performing the vehicle speed check comprises:
    when the vehicle speed is equal to or greater than a predetermined reference value (C) previously input to the control unit, performing an oil temperature determination by the control unit detecting a temperature of transmission oil and comparing the detected transmission oil temperature with a predetermined reference value (D) previously input to the control unit.

6. The method of claim 5, wherein the step of performing the oil temperature determination comprises:
    when the transmission oil temperature is equal to or greater than the predetermined reference value (D) previously input to the control unit, the oil supply is performed where the control unit supplies oil to the transmission by operating the EOP, wherein the oil supplied from the EOP is supplied to the gear of the transmission by controlling the solenoid valve, thus lubricating the gear.

7. The method of claim 5, wherein the step of performing the oil temperature determination further comprises:
    when the transmission oil temperature is less than the predetermined reference value (D) previously input to the control unit, performing a transmission temperature determination by the control unit detecting a temperature of the transmission and comparing the transmission temperature with a predetermined reference value (E) previously input to the control unit.

8. The method of claim 7, wherein the step of performing the transmission temperature determination comprises:
    detecting the transmission temperature; and
    when the transmission temperature is equal to or greater than the predetermined reference value (E) previously input to the control unit, performing the oil supply where the control unit supplies oil to the transmission by operating the EOP, wherein the oil supplied from the EOP is supplied to the gear of the transmission by controlling the solenoid valve, thus lubricating the gear.

9. The method of claim 7, wherein the step of performing the transmission temperature determination comprises:
    detecting the transmission temperature; and
    when the transmission temperature is less than the predetermined reference value (E) previously input to the control unit, the control unit does not operate the EOP.

10. The method of claim 1, wherein the step of performing the vehicle speed check comprises:
    when the vehicle speed is less than the predetermined reference value (C) previously input to the control unit, the control unit does not operate the EOP.

11. The method of claim 1, wherein the solenoid valve is disposed between a line for supplying oil to the clutch and a line for supplying oil to the gear.

12. The method of claim 1, wherein the solenoid valve is formed to be capable of adjusting a degree of opening thereof, thus enabling the oil supplied from the EOP to be distributed at a predetermined rate and supplied to the clutch or the gear.

* * * * *